INVENTOR
GUSTAV BOJNER
BY Sommers & Young
ATTORNEYS

Patented Jan. 7, 1947

2,413,942

UNITED STATES PATENT OFFICE 2,413,942

PROCESS OF DRYING PEAT AND OTHER AQUEOUS MATERIALS

Gustav Bojner, Stockholm, Sweden

Application April 7, 1943, Serial No. 482,182
In Sweden September 5, 1940

2 Claims. (Cl. 263—32)

The present invention relates to processes of drying aqueous materials continuously in two or more stages, more particularly materials in the form of lumps or in the granular state, such as peat and the like.

One object of the invention is to use the heat of the vapours derived from the aqueous material in a high temperature stage, as heating medium in a preceding low temperature stage.

Another object of the invention is to maintain a great difference between the temperatures of the heating medium and the aqueous material in the high temperature stage.

A further object of the invention is to increase the drying effect in the low temperature stage by means of the gases used in the high temperature stage as heating medium and conducted to the low temperature stage as drying medium.

A still further object of the invention is to improve the efficiency of the heating and to increase the drying effect of an apparatus of given dimensions.

The invention is described, by way of an example, in conjunction with one embodiment of a drying arrangement for carrying out the process according to the invention.

Figure 1:
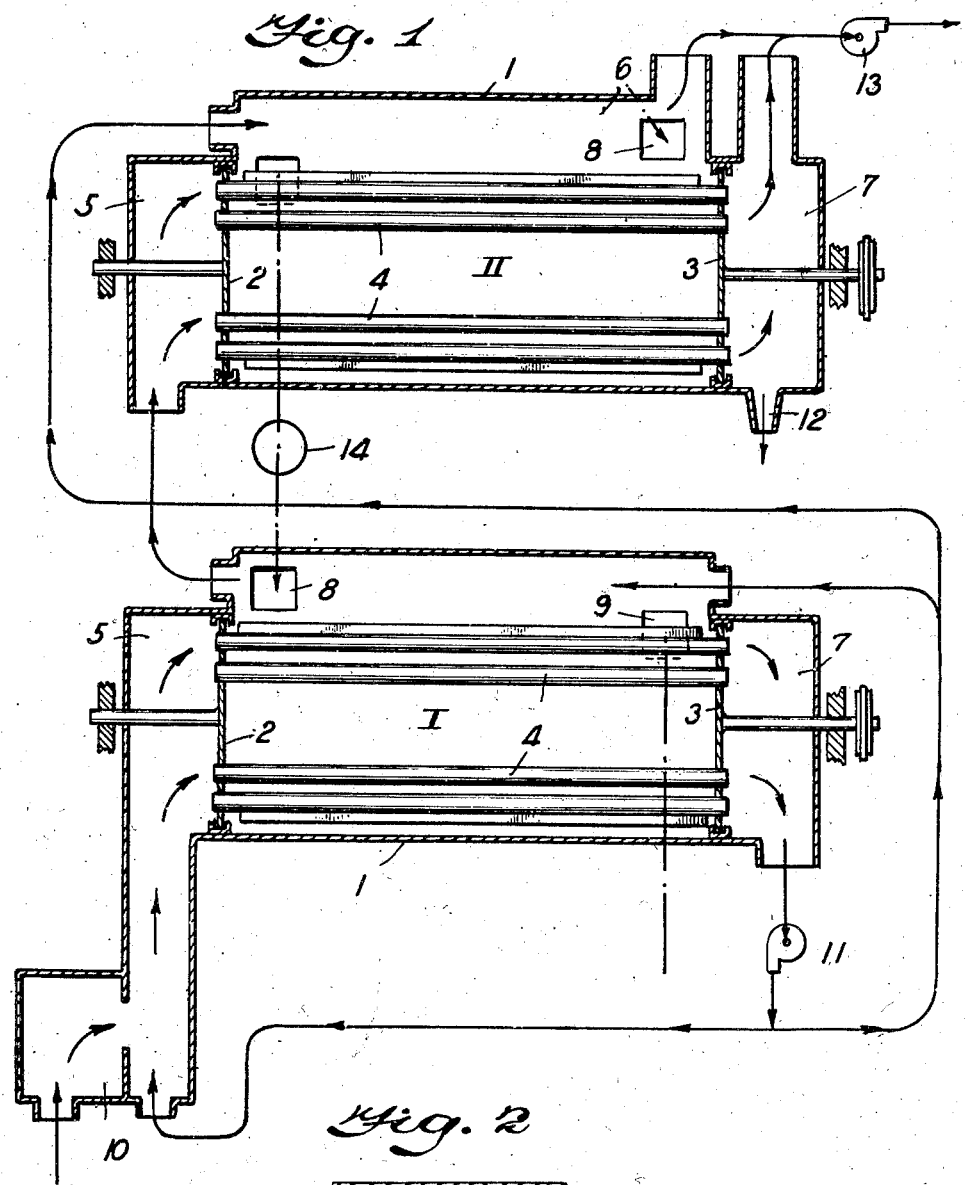
Fig. 1 illustrates schematically one embodiment of such an arrangement of drying apparatus.
Figure 2:
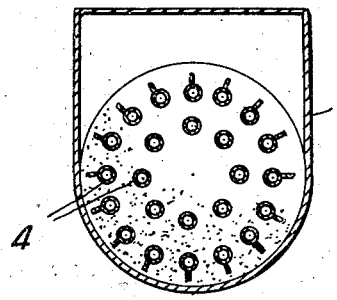
Fig. 2 shows a cross section through one of the drying apparatus shown in Fig. 1.

The arrangement illustrated in the drawing comprises one high temperature drying apparatus I in which the aqueous material, for instance peat, is completely dried, and one low temperature drying apparatus II in which the aqueous material is subjected to a preliminary drying treatment. Each drying apparatus comprises a stationary container 1 and a heating unit 2, 3, 4, rotatably mounted in said container and consisting of a number of tubes 4 securely mounted in two circular tube plates 2 and 3 rotatable in said container. By means of said tube plates the container 1 is divided into three chambers 5, 6, 7, of which the end chambers 5 and 7 are inlet and outlet chambers respectively for the heating medium, whereas the intermediate chamber 6 serves as a drying chamber for the aqueous material to be dried, which material continuously is introduced through an inlet opening 8 and carried out through an outlet opening 9, as shown by arrows in dash-and-dot lines. By the rotation of the heating unit a good transmission of heat from the tubes to the aqueous material is attained, as well as an effective stirring of the material during the drying operation. Preferably, the tubes internally are provided with heat transmitting members such as bands, bars, spiral members or the like, which are provided loosely in the tubes and are adapted to clean the heat transmitting surfaces automatically during the rotation.

The heating medium of the high temperature drying apparatus I consists of combustion gases or flue gases obtained from a furnace 10. Preferably, the temperature of these flue gases are reduced to about 400 or 600° C. before introduction into the inlet chamber 5 of the drying apparatus I. This reduction of the temperature is attained in the following way. A part of the flue gases which have passed through the heating unit of the drying apparatus I and thereby are cooled down, is conducted back to the inlet chamber by means of a blower 11. The remaining part of the flue gases corresponding to the quantity freshly produced in the furnace, are carried away to the low temperature drying apparatus for a purpose described below. The drying process in the apparatus I preferably is carried out with the same direction of flow of the flue gases and the aqueous material, and at a temperature of such high value which may be allowed with regard to the nature of the aqueous material to be dried. For instance, when peat is to be dried, this temperature may be increased toward the outlet of the peat, say to about 100° C. or more. The steam or aqueous vapour derived from the aqueous material dried is carried off by means of air or another gas, the amount of which should be selected in such manner that the escaping mixture of gas and vapour will have a maximum dew-point, that is a temperature of saturation which should reach about 90 or 99° C. In many cases the air which is introduced together with the aqueous material or which leaks into the apparatus, is sufficient for this purpose. If not, preferably a small amount of the flue gases which have passed through the heat transmitting unit and still have an excess of heat, may be introduced into the drying chamber of the apparatus I, to secure the flow of vapour out of this chamber, or a part of the flue gases from the furnace 10 or the mixing chamber 5 may be used for this purpose.

The mixture of vapour and gas which escapes from the drying chamber of the apparatus I and is substantially saturated with aqueous vapour, is introduced into the inlet chamber 5 of the low temperature drying apparatus II. Then, this mixture is passed through the heat transmitting unit 2—4 of this apparatus and, thus, is used as heating medium, transmitting heat indirectly to the aqueous material fed through the drying chamber 6 of the drying apparatus II in opposite direction to the drying medium flowing through this chamber. Of course, the drying treatment in the apparatus II is carried out at a lower temperature than in the apparatus I, so that the greater part of the content of vapour in the heating medium used in this apparatus, is condensed in the tubes and the vaporization heat of said vapour is transmitted to the aqueous material. The condensation liquid thus formed is drawn off through an outlet 12. The small amount of gases not condensed is carried away from the chamber 7 by means of a suction fan 13 or the like. To prevent any part of the vapour produced in the high temperature drying apparatus I, from flowing through the peat channel between the two apparatus in opposite direction to the peat moving in this channel from the apparatus II into the apparatus I, this channel preferably is provided with a sluicing device 14 for the material which device blocks up the passage for the vapours. The vapour produced in the drying chamber 6 of the apparatus II, which vapour, on account of the low drying temperature, has a pressure of a comparatively low value, is carried away from said chamber by means of the flue gases partly cooled down, which are obtained in great quantities from the high temperature drying apparatus and, if desired, mixed with air, are introduced into the drying chamber of the apparatus II. Then, these gases together with the vapour are let out through a funnel or the like. The remaining content of heat in the flue gases is utilized effectively by the direct contact with the aqueous material in the drying chamber of the apparatus II. Instead of conducting the flue gases into direct contact with the aqueous material in the apparatus II, these gases may be conducted through a heat exchanging apparatus (not shown) for heating air or another gas indirectly, which auxiliary gas then is introduced into the apparatus as drying medium for the material to be dried. This method is preferred when the aqueous material is of such nature that it will be contaminated by direct contact with the flue gases.

The drying medium which escapes from the apparatus II and is saturated with vapour, may be used as heating medium in a further stage, the vapour produced in this stage being carried away by means of flue gases or air, preferably preliminarily heated. However, the heat content of said drying medium also may be utilized for preliminarily heating the aqueous material directly or indirectly. In case of a direct transmission of the heat some water generally will condense upon the material which then is warmed up. Now, the moisture may be removed mechanically, for instance by compression or centrifugal action. In this way a water content which is much lower than before the heating, may be attained. If a third drying stage is used, the vapours produced in this stage and carried away by means of air or another gas, may be used for preliminarily heating the aqueous material in the same manner as in the preceding stages.

What I claim is:

1. An apparatus for continuously drying wet material in several stages, comprising, in combination, a container in each stage, constituting a drying chamber for the material to be dried, a rotatable tube set in each container, constituting a heating and stirring unit for the material to be dried, a furnace for producing hot gases, a flue conduit from the furnace to one end of the rotatable tube set of the last drying stage, a conduit from the opposite end of the rotatable tube set of the last drying stage to the drying chamber of the preceding drying stage, and a conduit from the drying chamber of the last drying stage to one end of the rotatable tube set of the preceding stage.

2. An apparatus for continuously drying wet material in several stages, comprising, in combination, a container in each stage, constituting a drying chamber for the material to be dried, a rotatable tube set in each container, constituting a heating and stirring unit for the material to be dried, a furnace for producing hot gases, a flue conduit from said furnace to one end of the rotatable tube set of the last drying stage, a conduit from the opposite end of the rotatable tube set of the last drying stage to the drying chamber of the preceding drying stage, a conduit from the drying chamber of the last drying stage to one end of the rotatable tube set of the preceding stage, and a conduit from said opposite end of the rotatable tube set of the last drying stage to the drying chamber of the same stage.

GUSTAV BOJNER.